United States Patent
Fristoe et al.

(10) Patent No.: US 9,228,246 B2
(45) Date of Patent: Jan. 5, 2016

(54) METHOD OF AGGLOMERATING SILICON/SILICON CARBIDE FROM WIRESAWING WASTE

(71) Applicant: Alternative Charge Materials, LLC, Charleston, SC (US)

(72) Inventors: Skip Fristoe, Charleston, SC (US); John Redshaw, Hennepin, IL (US); Rick O'Neil, Clarence, NY (US); Darren Doell, Clarence, NY (US)

(*) Notice: Subject to any disclaimer, the term of this patent is extended or adjusted under 35 U.S.C. 154(b) by 163 days.

(21) Appl. No.: 14/347,963

(22) PCT Filed: Jan. 10, 2014

(86) PCT No.: PCT/US2014/010995
§ 371 (c)(1),
(2) Date: Mar. 27, 2014

(87) PCT Pub. No.: WO2014/110337
PCT Pub. Date: Jul. 17, 2014

(65) Prior Publication Data
US 2015/0047470 A1    Feb. 19, 2015

Related U.S. Application Data

(60) Provisional application No. 61/751,401, filed on Jan. 11, 2013.

(51) Int. Cl.
| | |
|---|---|
| *B01J 2/14* | (2006.01) |
| *C22B 1/244* | (2006.01) |
| *B01J 2/26* | (2006.01) |
| *C01B 31/36* | (2006.01) |
| *C22B 1/24* | (2006.01) |
| *C22B 7/00* | (2006.01) |

(52) U.S. Cl.
CPC .... *C22B 1/244* (2013.01); *B01J 2/26* (2013.01); *C01B 31/36* (2013.01); *C22B 1/2406* (2013.01); *C22B 7/00* (2013.01); *Y02W 30/54* (2015.05)

(58) Field of Classification Search
CPC ............... B01J 2/28; B01J 20/18; B01J 2/14
USPC ........................................... 23/313 P
See application file for complete search history.

(56) References Cited

U.S. PATENT DOCUMENTS

| | | |
|---|---|---|
| 4,022,615 A | 5/1977 | Wells, III et al. |
| 4,348,230 A | 9/1982 | Aitcin et al. |
| 5,993,508 A | 11/1999 | Lutz |
| 6,113,473 A | 9/2000 | Costantini et al. |
| 6,126,531 A | 10/2000 | Iida et al. |
| 6,558,238 B1 | 5/2003 | Crevasse |
| 6,615,817 B2 | 9/2003 | Horio |
| 6,929,537 B2 | 8/2005 | Kajimoto |
| 7,541,387 B2 | 6/2009 | Dalla Valle |
| 8,425,639 B2 | 4/2013 | Gaundet et al. |
| 8,608,994 B2 | 12/2013 | Fregonese et al. |
| 2002/0020108 A1 | 2/2002 | Anderson |
| 2004/0144722 A1 | 7/2004 | Zavattari et al. |
| 2010/0189622 A1 | 7/2010 | Lan et al. |
| 2011/0059002 A1 | 3/2011 | Fallavollita |
| 2012/0110789 A1 | 5/2012 | Kaniut et al. |
| 2012/0180599 A1 | 7/2012 | Gunther et al. |

FOREIGN PATENT DOCUMENTS

| | | |
|---|---|---|
| CN | 102626954 | 8/2012 |
| EP | 0 289 934 A2 | 10/1988 |
| EP | 0 968 801 A1 | 5/2000 |
| EP | 2 474 390 A1 | 11/2012 |
| JP | 2005163130 | 6/2005 |
| WO | 0240407 | 5/2002 |
| WO | WO2004104012 A1 | 2/2004 |
| WO | 2012109459 | 8/2012 |

*Primary Examiner* — Edward Johnson
(74) *Attorney, Agent, or Firm* — Ernest Lipscomb; Barnwell Whaley Patterson & Helms

(57) ABSTRACT

The process of the present invention begins with a source of silicon and silicon carbide from wafer production. The silicon/silicon carbide waste material is dewatered as need be and passed to a mixer where the waste material is agglomerated. A binder is applied to the waste material either during agglomeration or during pelletizing. A variety of organic binders may be used such as polyvinyl alcohol, molasses, sodium silicate and polyethylene glycol; however, the preferred binder is a lignosulsulfonate. The amount of binder used will depend upon the particular binder and the feed material used. The silicon/silicon carbide-containing waste material is pelletized. The invention also provided silicon/silicon carbide-containing pellets that may be used as reduction material in smelting furnaces for the production of metals and alloys.

15 Claims, 2 Drawing Sheets

METHOD OF AGGLOMERATING SILICON/SILICON CARBIDE FROM WIRESAWING WASTE

CROSS-REFERENCE TO RELATED APPLICATIONS

This application is a National Stage entry of International application No. PCT/US14/10995 filed Jan. 10, 2014, on which the present application is based and benefits claimed under 35 U.S.C. 371, the entire specification, claims and drawings of which are incorporated herewith by reference, and the contents of Provisional application U.S. Ser. No. 61/751,404 filed Jan. 11, 2013, on which the PCT application is based and benefits claimed under 35 U.S.C. §119(e), is incorporated by reference.

BACKGROUND OF THE INVENTION

1. Field of the Invention

The present invention relates to methods for agglomerating recycled fines of silicon/silicon carbide resulting from the cutting of silicon ingots. More particularly, the present invention relates to silicon/silicon carbide agglomerations for use in metallurgical processes.

2. Description of Related Art

Silicon wafers used in the production of photovoltaic solar cells and/or microelectronics are prepared from silicon ingots. When the silicon wafers are cut there is a major loss of silicon during the cutting process. As technology for cutting thinner wafers develops, there is more waste material produced. Reciprocating wire saws contact the silicon ingot being sliced while a liquid slurry containing abrasive grains, such as silicon carbide, is supplied to a contact area between the silicon ingot and the wire saw. Used slurries from the wire saws are liquid suspensions of abrasive particles-silicon carbide or diamond grit-and abrasion products of the sawing operation, i.e., steel residue from the saw wires and silicon kerf from the silicon ingot. The liquid phase of the slurry is an organic or aqueous medium fulfilling the dual function of keeping the abrasive material in suspension and cooling the cutting zone between the wire and the silicon ingot, usually polyethylene glycol.

The abrasive particles of the slurry are rubbed by the wire saw against the ingot surface as the ingot is sliced causing silicon particles from the ingot to be removed resulting in loss of silicon. In addition, the silicon carbide abrasive grains break down and the wire wears adding increased particles in the slurry. The removed silicon resulting from the sliced ingot is known as the "saw kerf." As the concentration of silicon and silicon carbide (SiSiC) fines in the slurry increases, the efficiency of the slicing operation decreases. At some point, the slurry becomes loaded with SiSiC fines and is rendered ineffective, or "exhausted." If any of the exhausted slurry is to be used further it needs to be recycled or reprocessed. Namely, the silicon carbide, silicon and iron (from the wire) fines need to be removed from the "good" silicon carbide and the polyethylene glycol (PEG). The removed fines are the starting material for the processes of this invention. Historically these fines have not been utilized.

Specifically, although wire saw technology has improved, each pass of the wire through the silicon ingot results in the loss of an amount of silicon equivalent to about a 250 micron thick slice of the ingot or less. As technology enables thinner and thinner wafers to be sliced from the ingot, more and more passes of the wire through the ingot occur, resulting in more and more loss of silicon.

The exhausted slurry may be treated by various technologies to separate the good silicon carbide and polyethylene glycol from silicon carbide fines, the wire fines and the silicon kerf. As noted, the exhausted slurry contains good silicon carbide, fine silicon carbide, silicon kerf, iron fines and PEG. The remaining solid particle fraction of fines cannot be reused for wiresawing. There have been efforts to recover the silicon fines for further use; however, this further recovery processing often proves too costly and the exhausted slurry waste product is then sent to a land fill. Of course, this method of disposal is unfavorable from an environmental point of view, as well as, the costs associated therewith. In addition to the environmental and economic concerns associated with the exhausted slurry, the loss of potentially useful silicon/silicon carbide material should also be considered.

SiSiC material is useful in steel making as it acts as a fuel providing energy to the steel making process and serves as an effective slag deoxidizer. However, the SiSiC found in the abrasion slurries cannot be used in that form and must be processed to place the SiSiC in a form that can be used to economically make steel. Therefore, there is a need for a method to utilize the SiSiC created by the cutting of silicon ingots into a form so that the recovered SiSiC can be used in various applications, such as iron and steel melting, and other metallurgical processes using SiSiC addition. Thus, the possibility of utilizing recovered SiSiC material produced during silicon wafer production versus only utilizing silicon via costly and difficult methods is a major advantage of the present invention.

SUMMARY OF THE INVENTION

In accordance with the present invention processes are provided for forming pellets of SiSiC from a waste material of silicon wafer cutting. As used herein the term "waste material" also means "by-product." Further, the processes of this invention provide for agglomerating, pelletizing, drying and sizing silicon kerf, silicon/silicon carbide and mixtures thereof from a slurry of waste material into a form useful in metallurgical processes where the pellets provide energy and act as a slag deoxidizer.

The starting material for use in the process of this invention are the fines from the treatment of the exhausted slurry. The processes described herein begin with a source of silicon, such as silicon kerf, silicon carbide and mixtures thereof as waste material from an exhausted slurry resulting from silicon wafer production. The silicon/silicon carbide-containing waste material is dewatered, as need be. The silicon/silicon carbide-containing waste material is passed to an agglomerator, such as a mixer, where the fines contained in the silicon/silicon carbide waste material are agglomerated.

A binder is applied to the waste material either during agglomeration in the mixer or later during the pelletizing step. The addition of the binder gives structure to the agglomerated silicon/silicon carbide-containing waste material when the pellets are formed. A variety of organic binders may be used, such as polyvinyl alcohol, molasses, sodium silicate and polyethylene glycol; however, the preferred binder is a lignosulsulfonate. The amount of binder used will depend upon the particular binder used and the composition of the silicon/silicon carbide-containing feed material used, but is typically about 2% to about 8% by weight solids. The agglomerated silicon/silicon carbide-containing waste material is pelletized to a predetermined size and shape, the pelletized silicon/silicon carbide-containing waste material is dried and screened to the desired size depending upon its intended use.

The invention also provides silicon pellets or briquettes that may be used as reduction material in smelting furnaces for the production of metals and alloys, more particularly for the use in smelting furnaces an energy source and slag deoxidizer for the production of iron, steel, ferroalloys and other metallurgical processes.

It is therefore the general object of the present invention to provide viable and practical processes to convert otherwise unusable silicon/silicon carbide-containing waste material into a form that can be utilized in metallurgical processes.

Another object of the present invention is to provide a silicon/silicon carbide product, for use in metallurgical processes.

Other objects, features and advantages of the present invention will become apparent from the following detailed description of the invention taken on conjunction with the accompanying drawings.

BRIEF DESCRIPTION OF THE DRAWINGS

Having described the invention in general terms, reference will now be made to the accompanying drawings, which are not necessarily drawn to scale, and wherein.

DESCRIPTION OF THE PREFERRED EMBODIMENT(S)

The present invention now will be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art. Like numbers refer to the elements throughout.

Briefly, the processes of the present invention begins with a source of silicon, such as silicon kerf, silicon carbide and mixtures thereof sourced from the waste material resulting from silicon wafer production. The silicon kerf and silicon carbide fine are separated from the liquid phase of the slurry (PEG) and typically the still lusable silicon carbide from the silicon wafer production using prior art solid-liquid separation techniques. This starting material is referred to herein "silicon/silicon carbide-containing waste material." The silicon/silicon carbide-containing waste material is optionally dewatered, if desired. The waste material having a predetermined water content is passed to a mixer where the waste material is agglomerated. A binder is applied to the waste material either during mixing or during pelletizing. The agglomerated waste material is pelletized to a predetermined size and shape, the pelletized agglomeration is dried and screened to a predetermined size. In some instances this material can be referred to as "pellets." The silicon/silicon carbide-containing waste material may be silicon/silicon carbide particles from a silicon wafer cutting operation or any number of other sources of silicon and or silicon carbide.

As used herein, the term "silicon kerf" means the silicon material produced during the cutting or grinding process such as ingot shaping, wire saw slicing of silicon ingots to form silicon wafers, grinding and polishing of silicon wafers and silicon parts. It is typically contaminated with the abrasives and metals utilized to saw the ingot, the carrier fluid or other chemicals in the slicing, grinding and polishing medium. As noted, the silicon kerf and silicon carbide are separated from the PEG.

While it is desirable that the silicon/silicon carbide-containing waste feed material be relatively dry, when the silicon/silicon carbide-containing waste feed material has a moisture content above about 25% by weight a sludge is formed. Thus, it is desirable the waste material be at a moist content below 25% prior to agglomerating, preferably about 10% to about 20% by weight, and most preferably to about 15% prior to the mixing step. Having the proper amount of moisture in the silicon/silicon carbide-containing waste feed material enables the silicon/silicon carbide fines to agglomerate to determine size and/or shape.

Figure 1:
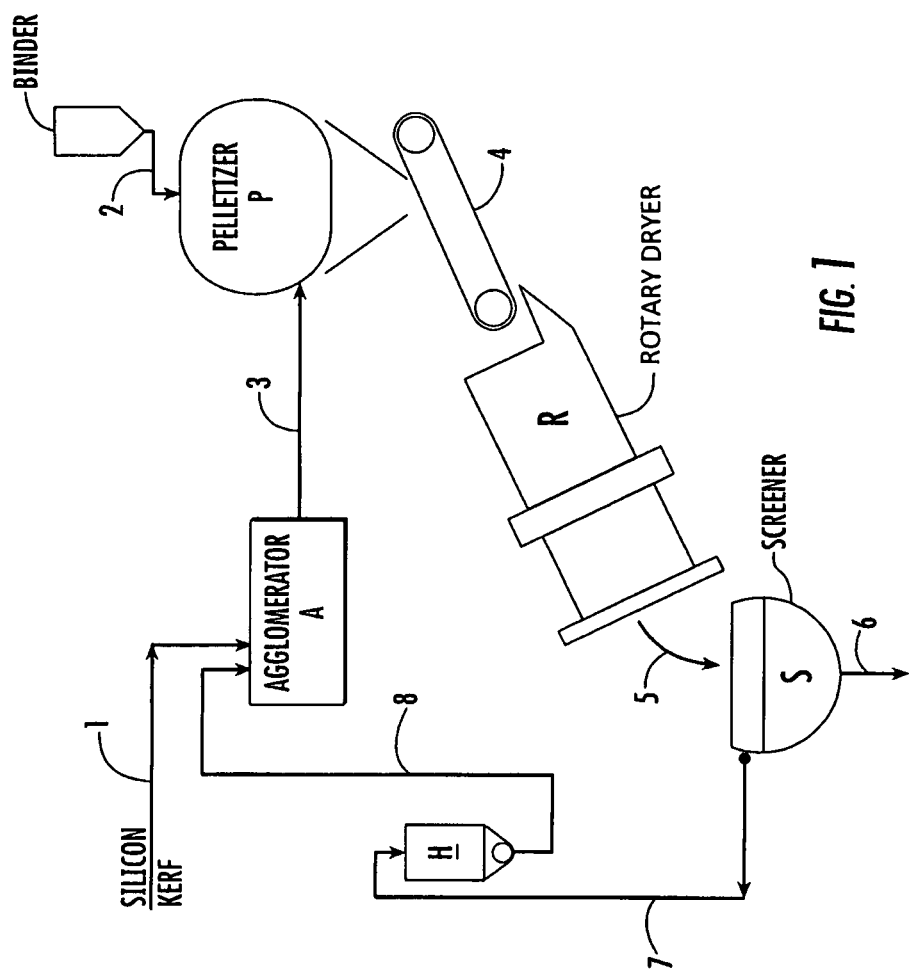
FIG. 1 is a schematic flow diagram which illustrates an embodiment of a process of the present invention showing the agglomerating step, the binding/pelletizing step and the drying step.

Referring now FIG. 1, there is shown a schematic diagram of an embodiment of a process of the present invention. A source of silicon, or silicon/silicon carbide or a mixture thereof is introduced through feed line 1 to agglomerator A to agglomerate the silicon/silicon carbide-containing waste material to a predetermined particle size, typically not greater than about 5 microns. The agglomerator A may be any one of several types but is typically a mixer, such as a pin mixer.

The agglomerated material is then passed from the agglomerator A through line 3 to a pelletizer P. It should be understood that the final size of the product can be done in the mixer or agglomerator. Various types of pelletizers are available for this step, such as a disc or drum pelletizer, where the agglomerate is formed into pellets. The conditions used in the agglomerator will vary between different types of agglomerators and can be determined by those skilled in the art.

A binder is added to agglomerated silicon/silicon carbide-containing material in the pelletizer P through line 2. The binder gives structure to the agglomerated waste material when the pellets are formed. A variety of organic binders may be used such as polyvinyl alcohol, molasses, sodium silicate and polyethylene glycol; however, the preferred binder is a lignosulsulfonate. Lignosulfonates are water-soluble anionic polyelectrolyte polymers produced from the production of wood pulp using sulfite pulping. The amount of binder used will depend upon the particular binder and the feed material used, but is typically about 2% to about 8% by weight solids, preferably about 4% to about 6% by weight solids. The binder is contained in an aqueous form and sprayed onto the agglomerated waste material while pelletizing. The moisture content of the agglomerate, due to the aqueous solution of binder is reduced during the process but is generally in the range of about 20% to about 35%. The size of the pelletized material will depend upon its end use and may be controlled within the agglomerating or pelletizing operation. It should be understood that the term "pellet" includes "briquette." While it is desirable that all of the pellets are within the predetermined size and shape, it should be understood that at least a portion of the pellets will be off-sized material. The pellets are conveyed along conveyer 4 from the pelletizer P to the dryer.

It should be noted that different types of drying may be used but as shown in FIG. 1 the dryer R may be a rotary dryer. Other dryers that may be used include fluid bed dryers. It is important that the pellets have a final moisture content less than about 5% by weight. Reducing the moisture content of the silicon/silicon carbide-containing pellets causes the binder to give increased crush strength to the finished product. The silicon/silicon carbide-containing pellets at a predetermined moisture content are passed at 5 to screener S where the pellets are screened to the desired size. That size will depend to some extent on the end use of the finished silicon/silicon carbide-containing product, which may be in the form of pellets, briquettes, granules or the like. Next the product exits the screener and is introduced to a chiller to rapidly cool the sized agglomerations to prevent absorption of humidity. In a fluidized bed dryer this cooling process may be all inclusive. From there the finished silicon/silicon carbide-containing product exits through line 6 where the finished product proceeds to packaging. The material that is not within the predetermined specification is recycled through line 7 to a hopper H. Off-sized material from hopper H may reprocessed by passing the material through line 8 to the agglomerator A.

Figure 2:
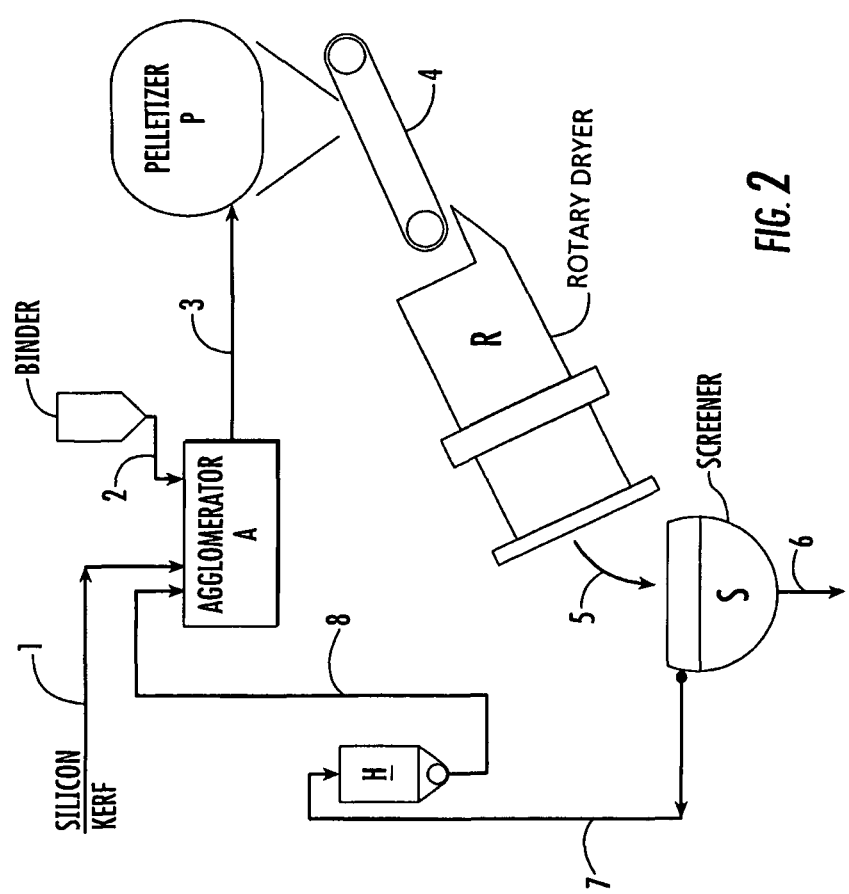
FIG. 2 is a schematic flow diagram which illustrates an alternative embodiment of the process of the present invention showing the agglomerating/binding step followed by the pelletizing step and the drying step.

In an alternative embodiment, that shown in FIG. 2, the process has similarities to the process of FIG. 1. The silicon/silicon carbide-containing waste feed material at the desired moisture content is passed through line 3 to agglomerator A when the binder is applied. The binder is the same binder that used in the process of FIG. 1. The agglomerated/binder-containing silicon/silicon carbide material is passed to a pelletizer P, such as a disc or drum pelletizer where the agglomerated material is formed into pellets of a predetermined size. As with the process of FIG. 1, the pelletized material is dried and screened. Off-material is recycled.

The silicon/silicon carbide-containing pellets resulting from the equipment discussed above are typically from −4 mesh to +25 mesh when used as an injectable material for metallurgical processes, preferably from about 1 to about 5 millimeters. The binder increases the crush strength of the silicon/silicon carbide-containing pellets and typically form a pellet having a crush strength between about 1 and 4 lbs. Other equipment can be used to produce equally uniformed and sized silicon/silicon carbide-containing products ranging from 6" and down, and these end products are also used for metallurgical processes.

The silicon agglomerations can be used in a primary furnace such as an EAF, a BOF, cupola, an electric induction furnace, or an electric line frequency furnace; they can also be used in holding furnaces. Ladle furnaces, ladles, tundishes, torpedo transportation cars, or any other vessel that contains molten metal. The silicon/silicon carbide-containing pellets act as either or both a reduction material or a source to provide silicon pickup to molten metal. The pellets, depending on their application, and thus the form and size of the pellet, may be introduced to the molten metal through any of the following means; injection, briquettes, or packaged in steel pails, drums, cans, or any other container deemed appropriate to the metal making and forming application.

Example

To illustrate the process of this invention a feed material of SiSiC was dried in an oven and the moisture content was reduced from 31% to 14%. The dried material having an average size of −60 mesh was feed into a batch pin mixer and run for 15 seconds at 900 rpm. A uniform discharge with no seed pellets was formed in the pin mixer. This material was fed onto a 24" pan pelletizer and sprayed with a 33% solids solution of lignosulfonate binder. Small seed pellets formed and grew uniformly across the pan pelletizer as the binder was sprayed onto the growing pellets. On-size pellets were discharged between 6-10 mesh. Final discharge moisture coming off the pelletizer was 23%. Dry crush strength was between 1.8 and 2.0 lbs.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for making silicon/silicon carbide pellets from the waste material of silicon wafer manufacturing comprising:

providing silicon/silicon carbide-containing waste material at a moisture content below about 25% by weight solids;

forming an agglomerate of silicon/silicon carbide-containing having particles of a predetermined size;

feeding a controlled amount of said silicon/silicon carbide-containing agglomerate into a pelletizer;

adding from about 2% to about 8% by weight of a binder selected from the group consisting of polyvinyl alcohol, sodium silicate, polyethylene glycol, and lignin while pelletizing to bind said silicon/silicon carbide-containing particles in said agglomerate;

pelletizing to compact said silicon/silicon carbide-containing agglomerate in said pelletizer to form a silicon/carbide-containing pellet having a predetermined particle size; and discharging said pellet from said pelletizer.

2. The method according to claim 1 wherein said waste material containing silicon fines is dewatered to a moisture content between about 10% to about 20% prior to said agglomerating step.

3. The method according to claim 1 wherein said binder is present in an amount between about 4% and about 6% by weight solids.

4. The method according to claim 1 wherein said binder is lignin.

5. The method according to claim 1 said predetermined particle size is from about 4 mesh to about 25 mesh.

6. The method according to claim 1 wherein said process further comprises drying said pellet to a moisture content is no greater than about 5% by weight.

7. A method for making silicon/silicon carbide pellets from the waste material of silicon wafer manufacturing comprising:

providing a silicon/carbide-containing, waste material having a median particle size not greater than about 5 microns and a moisture content below about 25% by weight solids;

forming an agglomerate of said silicon/silicon carbide-containing waste material with from about 2% to about 8% by weight of an organic binder to form an agglomerate;

feeding said bound silicon/silicon carbide-containing agglomerate into a pelletizer;

pelletizing said bound silicon/silicon carbide-containing agglomerate to compact said agglomerate in said pelletizer to form a silicon/carbide-containing pellet having a predetermined size, and discharging said pellet from said pelletizer.

8. The method according to claim 7 wherein said waste material containing silicon fines is dewatered to a moisture content between about 10% to about 20% prior to the mixing step.

9. The method according to claim 7 wherein said binder is present in an amount between about 4% and about 6% by weight solids.

10. The method according to claim 7 wherein said organic binder is a member of the group consisting of polyvinyl alcohol, and polyethylene glycol.

11. The method according to claim 7 wherein said binder is a lignosulfonate.

12. The method according to claim 7 wherein said predetermined particle size is from about 4 mesh to about 10 mesh.

13. The method according to claim 7 wherein said process further comprises drying said pellet to a moisture content not greater than about 5% by weight.

14. A method for making silicon/silicon carbide pellets from the waste material of silicon wafer manufacture consisting essentially of:
   providing waste material containing silicon fines;
   dewatering said waste material to a moisture content between about 10% and about 20% by weight solids;
   adding from about 2% to about 8% by weight of a binder selected from the group consisting of polyvinyl alcohol, molasses, sodium silicate, polyethylene glycol and lignosulfonate to said waste material;
   agglomerating waste material containing silicon fines to a predetermined size;
   pelletizing said agglomerate to form a pellet of bound silicon/silicon carbide of particle size from about 4 mesh to about 25 mesh;
   discharging said pellet from said pelletizer; and
   drying said pellets to a moisture content not greater than about 5% by weight.

15. The method according to claim 14 wherein said binder is present in an amount between about 4% and about 6% by weight solids.

* * * * *